United States Patent
Meng et al.

(10) Patent No.: US 10,315,542 B2
(45) Date of Patent: Jun. 11, 2019

(54) VEHICLE SEAT WITH ENERGY ABSORPTION STRUCTURE

(71) Applicant: YANFENG ADIENT SEATING CO., LTD., Shanghai (CN)

(72) Inventors: Qingbao Meng, Shanghai (CN); Yueyun Chen, Shanghai (CN); Huijia Tao, Shanghai (CN)

(73) Assignee: Yanfeng Adient Seating Co., Ltd., Shanghai (CN)

( * ) Notice: Subject to any disclaimer, the term of this patent is extended or adjusted under 35 U.S.C. 154(b) by 148 days.

(21) Appl. No.: 15/545,508

(22) PCT Filed: Jan. 11, 2016

(86) PCT No.: PCT/CN2016/070576
§ 371 (c)(1),
(2) Date: Jul. 21, 2017

(87) PCT Pub. No.: WO2016/115986
PCT Pub. Date: Jul. 28, 2016

(65) Prior Publication Data
US 2018/0009342 A1 Jan. 11, 2018

(30) Foreign Application Priority Data
Jan. 22, 2015 (CN) .......................... 2015 1 0032544

(51) Int. Cl.
*B60N 2/427* (2006.01)
*B60N 2/68* (2006.01)
(Continued)

(52) U.S. Cl.
CPC ........... *B60N 2/42709* (2013.01); *B60N 2/22* (2013.01); *B60N 2/4228* (2013.01); *B60N 2/68* (2013.01); *B60N 2/682* (2013.01)

(58) Field of Classification Search
CPC .............. B60N 2/42709; B60N 2/4221; B60N 2/4228; B60N 2/427
See application file for complete search history.

(56) References Cited

U.S. PATENT DOCUMENTS 5,219,202 A * 6/1993 Rink ..................... B60N 2/4214
297/216.13
5,730,459 A * 3/1998 Kanda ................. B60R 21/2037
280/728.2
(Continued)

FOREIGN PATENT DOCUMENTS

CN         1640714 A      7/2005
CN       101905664 A     12/2010
(Continued)

OTHER PUBLICATIONS

International Search Report, dated Apr. 14, 2016 (PCT/CN2016/070576).

*Primary Examiner* — Timothy J Brindley
(74) *Attorney, Agent, or Firm* — Robert L Stearns; Dickinson Wright, PLLC (57) ABSTRACT

A vehicle seat with an energy absorption structure, includes a cushion side plate and an angle adjuster lower connection plate, wherein an impact groove is provided on the angle adjuster lower connection plate, and the impact groove includes a straight groove part and a circular groove part communicating each other from top to bottom. The vehicle seat further includes an energy absorption disc including an annular part, a position part and impact fracture parts connected between the annular part and the position part. A first nut is securely coupled to the cushion side plate. A step bolt is provided including a head part, a step part and a stud which are coaxially connected in sequence. The stud bolt passes through the circular groove part, the annular part and threads to the first nut to make the step part passing through (Continued)

the circular groove part and press-fitting with the energy absorption disc. The vehicle seat has a simple structure, convenient installation, and can absorb energy during collision so as to reduce the head rebound speed during the vehicle collision and protect passengers, thereby improving vehicle safety level.

7 Claims, 9 Drawing Sheets (51) Int. Cl.
*B60N 2/22* (2006.01)
*B60N 2/42* (2006.01)

(56) References Cited

U.S. PATENT DOCUMENTS

| | | | | |
|---|---|---|---|---|
| 6,053,571 | A * | 4/2000 | Faigle | B60N 2/4228 297/216.1 |
| 7,854,477 | B2 * | 12/2010 | Axelsson | B60N 2/4228 297/216.1 |
| 7,866,702 | B2 * | 1/2011 | Murphy | B60N 2/2809 188/371 |
| 7,992,934 | B2 * | 8/2011 | Cailleteau | B60N 2/2209 188/376 |
| 2005/0077763 | A1 * | 4/2005 | Kawashima | B60N 2/42745 297/216.14 |
| 2005/0140190 | A1 * | 6/2005 | Kawashima | B60N 2/4228 297/216.14 |
| 2007/0273193 | A1 * | 11/2007 | Ichikawa | B60N 2/071 297/344.12 |
| 2010/0096892 | A1 | 4/2010 | Meghira et al. | |
| 2010/0176621 | A1 * | 7/2010 | Aufrere | B60N 2/015 296/68.1 |
| 2010/0259076 | A1 * | 10/2010 | Meghira | B60N 2/4214 297/216.1 |
| 2013/0307301 | A1 | 11/2013 | Munemura et al. | |
| 2015/0239373 | A1 | 8/2015 | Weng et al. | |
| 2017/0096082 | A1 * | 4/2017 | Kurihara | B60N 2/1615 |
| 2018/0086237 | A1 * | 3/2018 | Couasnon | B60N 2/1615 |

FOREIGN PATENT DOCUMENTS

| | | | |
|---|---|---|---|
| CN | 103249595 A | 8/2013 | |
| DE | 102015202586 A1 | 8/2015 | |
| DE | 102014217506 A1 * | 3/2016 | B60N 2/0232 |
| JP | 5521160 B2 | 6/2014 | |
| WO | WO-2012013371 A1 * | 2/2012 | B60N 2/4709 |
| WO | 2012077444 A1 | 6/2012 | |
| WO | WO-2012077444 A1 * | 6/2012 | B60N 2/4228 |
| WO | WO-2013042550 A1 * | 3/2013 | B60N 2/4228 |

* cited by examiner

VEHICLE SEAT WITH ENERGY ABSORPTION STRUCTURE

BACKGROUND

1. Technical Field

The present invention relates to a vehicle seat, especially to a vehicle seat with an energy absorption structure.

2. Related Art

When a vehicle travels, if rear-end collision happens, it is highly possible to cause whiplash injury to the driver and passengers in the vehicle. The "whiplash injury" means the neck of human will present a motion like being whiplashed under the combined action of the impact acceleration and the head inertia force. After the collision, the injured will feel varying degrees of neck discomfort, which is not fatal, but the process of rehabilitation is complex, lengthy, and in some case it is an incurable permanent harm. In order to reduce damage, the vehicle manufacturers have begun to develop a vehicle seat capable of absorbing impact energy. For example, patent application CN103249595A, CN1640714A and US20100096892A1 respectively provide a vehicle seat capable of absorbing impact energy. However, these vehicle seats have complex structure and high cost.

SUMMARY OF THE INVENTION

In view of the deficiency of the prior art, the present invention provides a vehicle seat with energy absorption structure with excellent energy absorption effect, simple structure and low cost.

To achieve the above purpose, the present invention adopts the following technical solutions:

A vehicle seat with an energy absorption structure including a cushion side plate and an angle adjuster lower connection plate, wherein an impact groove is provided on the angle adjuster lower connection plate, and the impact groove includes a straight groove part and a circular groove part communicating each other from top to bottom, wherein the vehicle seat further includes:

an energy absorption disc, including an annular part, a position part and impact fracture parts connected between the annular part and the position part;

a first nut securely coupling to the cushion side plate; and a step bolt including a head part, a step part and a stud which are coaxially mounted in sequence, the stud passes through the circular groove part, the annular part and threads to the first nut, in this way, the step part passing through the circular groove part and press-fitting with the energy absorption disc.

Furthermore, the cushion side plate and the angle adjuster lower connection plate are connected by a front bolt and a second nut.

Preferably, the outer diameter of the step part is smaller than the inner diameter of the circular groove part so that the lowest point of the step part is spaced from the lowest point of the circular groove part when the step part press fits with the energy absorption disc.

Preferably, the angle adjuster lower connection plate is a planar structure.

Preferably, the angle adjuster lower connection plate includes a cushion mounting surface and an energy absorption disc mounting surface at different horizontal planes, so that the energy absorption disc is flush with the cushion mounting surface after mounting on the energy absorption disc mounting surface.

Furthermore, the cross-sectional area of the impact fracture part is 6-9 mm$^2$.

Furthermore, the first nut is welded on the cushion side plate.

The vehicle seat of the present invention has simple structure, convenient installation, and can absorb energy during collision so as to reduce the head rebound speed during the vehicle collision and protect passengers, thereby improving vehicle safety level.

DETAILED DESCRIPTION OF THE PREFERRED EMBODIMENTS

Preferred embodiments of the present invention are given in conjunction with the drawings and described in detail so that the functions and features of the present invention can be better understood.

Figure 1:
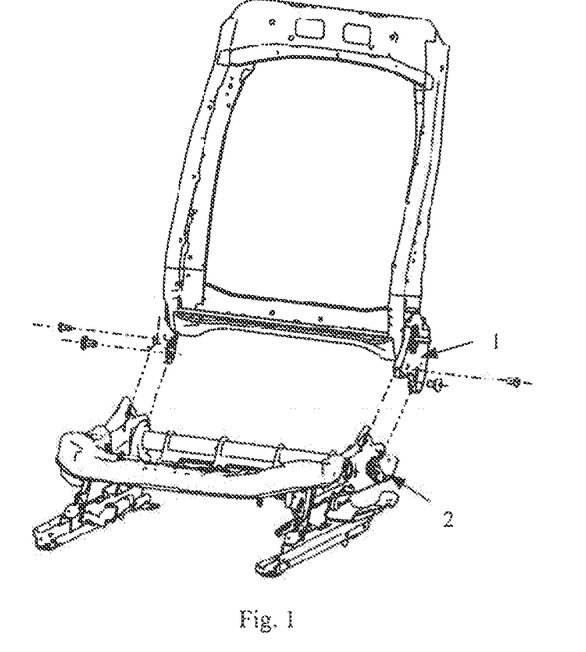
FIG. 1 is a structural diagram of a vehicle seat according to the present invention.

FIG. 1 shows a conventional vehicle seat including a cushion assembly and a back chair assembly. The back chair assembly is provided with angle adjuster lower connection plates 1 on two lower sides thereof; the cushion assembly is provided with cushion side plates 2 on two rear sides thereof; and the cushion assembly and the back chair assembly are connected together by the cushion side plates 2 and the angle adjuster lower connection plates 1.

Figure 2:
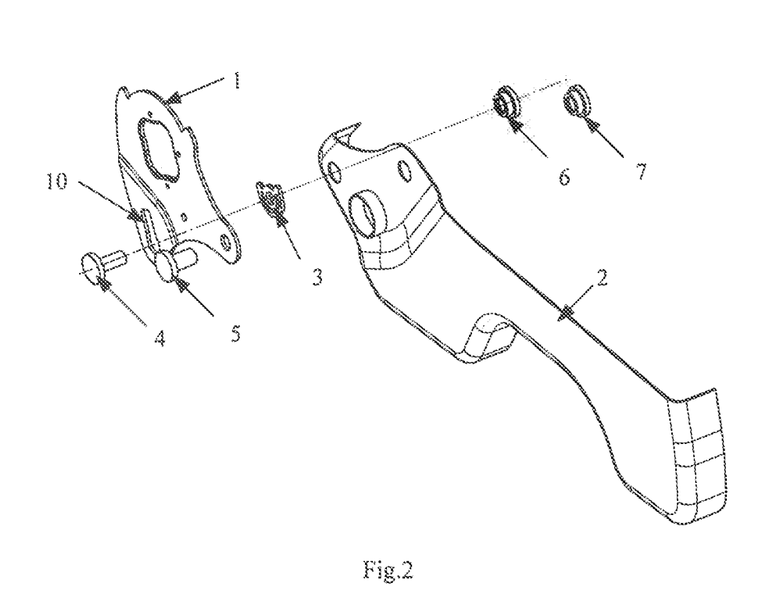
FIG. 2 is an exploded view of the energy absorption structure according to the present invention.
Figure 3:
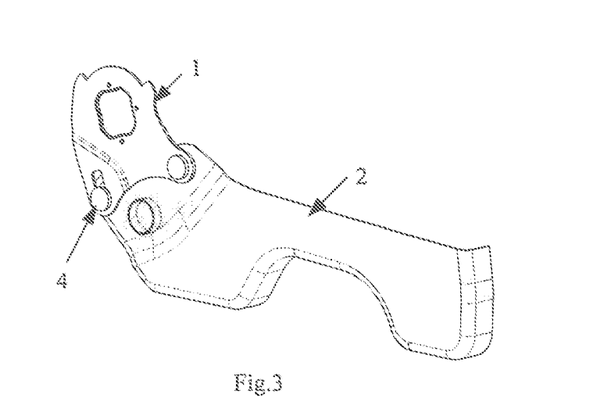
FIG. 3 is an assembly view of the energy absorption structure according to the present invention.

In order to absorb impact energy applied to the back chair assembly during collision, the present invention adds an energy absorption disc 3 between the cushion side plate 2 and the angle adjuster lower connection plate 1 (see FIG. 2). The energy absorption discs 3 connect to the cushion side plates 2 and the angle adjuster lower connection plates 1 by a first nut 6 matched to a step bolt 4. Correspondingly, the cushion side plate 2 is provided with a hole through which the first nut 6 passes, and the angle adjuster lower connection plate 1 is provided with an impact groove 10 through which the step bolt 4 passes. The impact groove 10 includes an upper straight groove part and a lower circular groove part. Preferably, in addition to the first nut 6 and the step bolt 4, the cushion side plate 2 and the angle adjuster lower connection plate 1 are further directly connected together by a front bolt 5 and a second nut 7. FIG. 3 shows the assembled energy absorption structure.

Figure 4A:
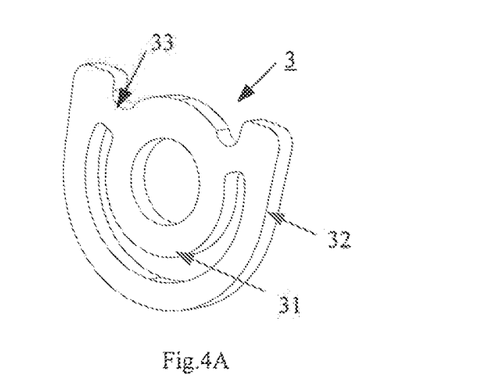
FIG. 4A is a structural diagram of the first embodiment of the energy absorption disc in FIG. 2.
Figure 4B:
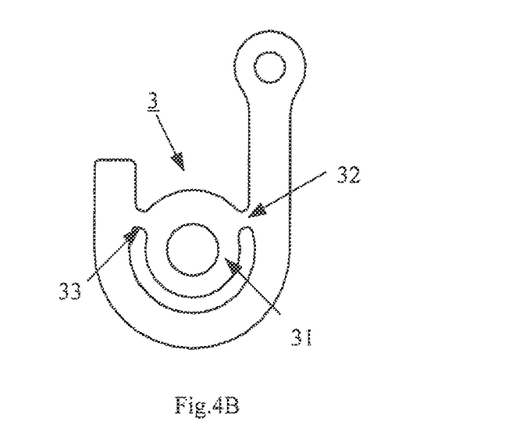
FIG. 4B is a structural diagram of the second embodiment of the energy absorption disc in FIG. 2.
Figure 4C:
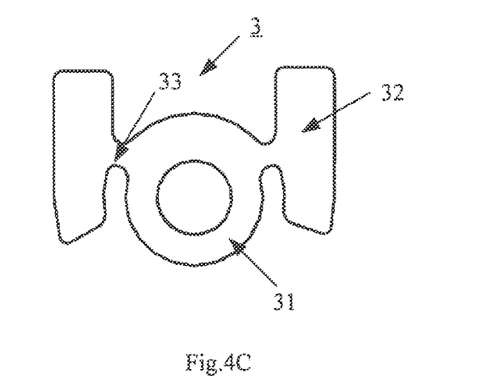
FIG. 4C is a structural diagram of the third embodiment of the energy absorption disc in FIG. 2.
Figure 4D:
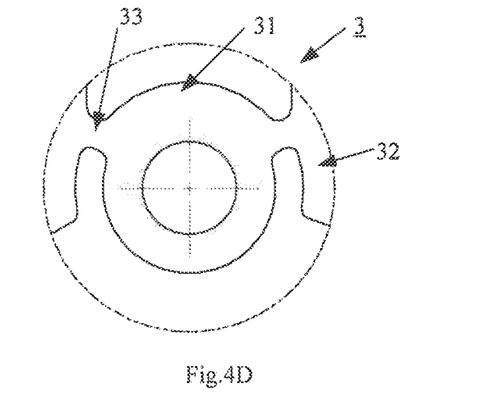
FIG. 4D is a structural diagram of the fourth embodiment of the energy absorption disc in FIG. 2.

FIGS. 4A-4D show several varieties of the above energy absorption disc 3. The energy absorption disc 3 each includes an annular part 31, impact fracture parts 33 disposed on two sides of the annular part 31, and a position part 32 connecting to the impact fracture parts 33. In FIG. 4A, the position part 32 is shown as U-shaped structure surrounding most of the circumference of the annular part 31. In FIG. 4B, the position part 32 is shown as J-shaped structure, wherein the upper end thereof is provided with a hole for inserting a fastener, the lower end surrounds most of the circumference of the annular part 31. In FIG. 4C, the position part 32 includes two position sections connecting to the impact fracture parts 33 on two sides of the annular part 31 respectively. In FIG. 4D, the position part 32 includes two position sections connecting to the impact fracture parts 33 on two sides of the annular part 31 respectively and a circular frame for connecting said two position sections. Herein, the annular part 31 of the energy absorption disc 3 and the circular groove part on the angle adjuster lower connection plate 1 are disposed coaxially. The hole at the center of the annular part 31 is used for passing through the stud of the staircase bolt 4. The position part 32 contacts with the angle adjuster lower connection plate 1 to locate the energy absorption disc 3 internal to the angle adjuster lower connection plate 1 (opposite to the side of the cushion side plate). As shown, the structural deformations of the energy absorption disc 3 are mainly presented on the position part 32. In addition, other appropriate forms other than FIGS. 4A-4D may also be used. The width of the impact fracture part 33 is significantly less than the diameter of the annular part 31 (the cross-sectional area thereof is 6-9 mm$^2$, which can be varied according to the force applied on the vehicle seat energy absorption structure). When the rear-end collision happens and the collision exceeds a certain level, the impact fracture parts 33 will break.

Figure 5A:
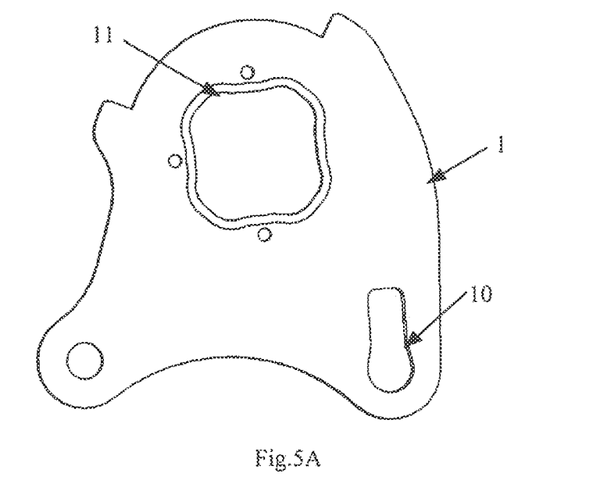
FIG. 5A is a structural diagram of the first embodiment of the angle adjuster lower connection plate in FIG. 2.
Figure 5B:
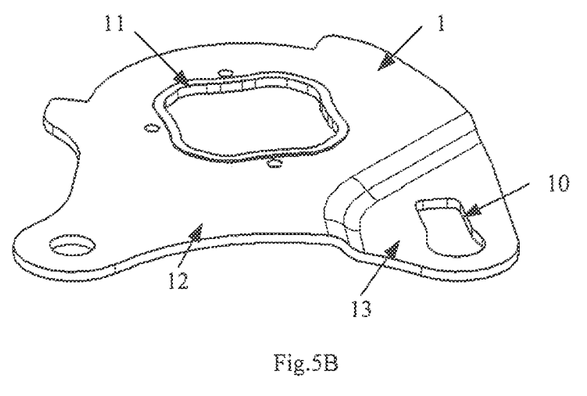
FIG. 5B is a structural diagram of the second embodiment of the angle adjuster lower connection plate in FIG. 2.
Figure 6:
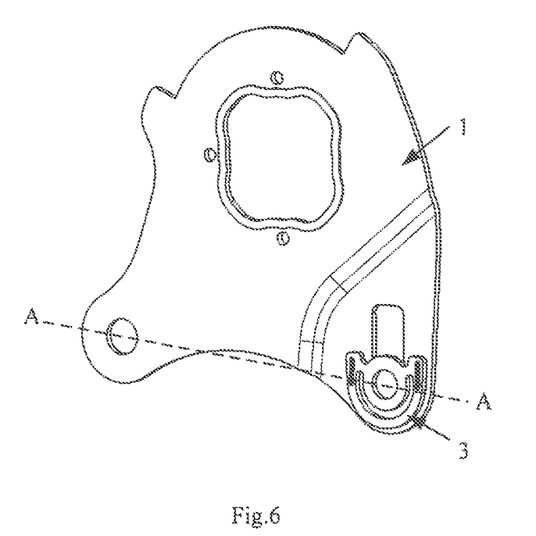
FIG. 6A is a diagram showing the connection between the energy absorption disc in FIG. 4A and the angle adjuster lower connection plate in FIG. 5B.
FIG. 6B is a cutaway diagram along the A-A line in FIG. 6A.
Figure 6B:
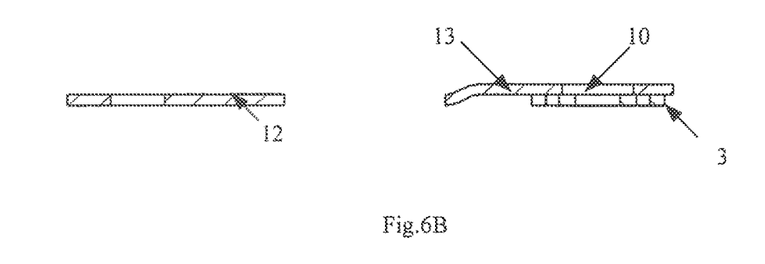

FIGS. 5A-5B shows two embodiments of the angle adjuster lower connection plate 1. The angle adjuster lower connection plate 1 as shown in FIG. 5A is planar, i.e. comprises a plane, on which an impact groove 10, a hole for passing through the stud of the front bolt 5 and a mounting hole 11 for mounting the angle adjustor (not shown) are provided. The angle adjuster lower connection plate 1 in FIG. 5B is similar with that in FIG. 5A, except that it shapes as a step, i.e., including a cushion mounting surface 12 and an energy absorption disc mounting surface 13 at different planes. Herein, the cushion mounting surface 12 is used for mounting a cushion. Both the above-mentioned hole for passing through the stud of the front bolt 5 and the mounting hole 11 for mounting the angle adjustor (not shown) are disposed on the cushion mounting surface 12. The impact groove 10 is provided on the energy absorption disc mounting surface 13 for mounting the energy absorption disc 3. As shown in FIGS. 6A-6B, when the energy absorption disc 3 is mounted on the energy absorption disc mounting surface 13, the top surface of the energy absorption disc 3 is coplanar with the top surface of the cushion mounting surface 12 (i.e., the altitude difference between the cushion mounting surface 12 and the energy absorption disc mounting surface 13 corresponds to the thickness of the energy absorption disc 3). In this way, the cushion can be manufactured into a flat shape, rather than a step, in order to reduce the cost for the clamp tools and check tools for manufacturing the cushion and back chair, and facilitate the installation of the cushion and the back chair.

Figure 7:
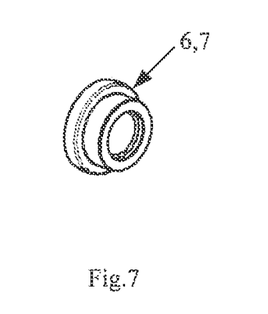
FIG. 7 is a structural diagram of the nut in FIG. 2.
Figure 8A:
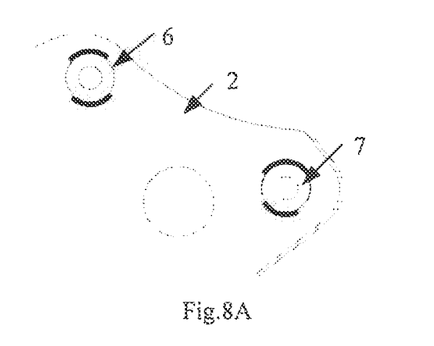
FIG. 8A is a diagram showing the nut in FIG. 7 welded on the cushion side plate.
Figure 8B:
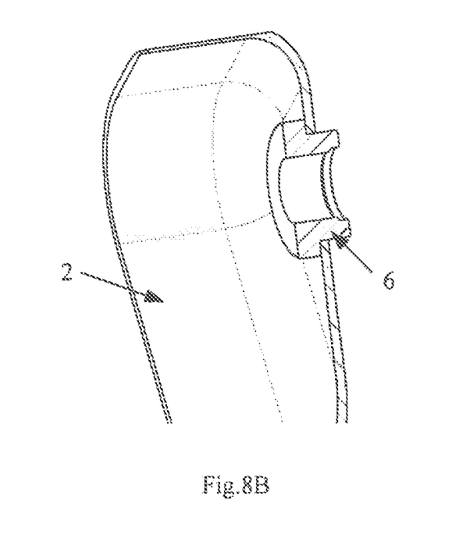
FIG. 8B is a cutaway diagram showing the nut in FIG. 7 welded on the cushion side plate.
Figure 9:
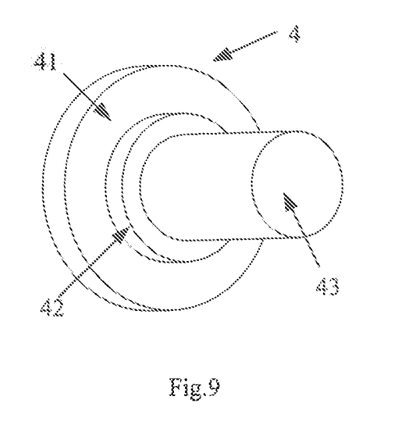
FIG. 9 is a structural diagram of the step bolt in FIG. 2.

The nuts of the present invention as shown in FIG. 7 are conventional nuts in the art. In the embodiments of FIGS. 8A-8B, the nuts 6, 7 are welded on the cushion side plates 2. Furthermore, the step bolt 4 of the present invention as shown in FIG. 9 is a conventional step bolt in the art and includes a head part 41 with a large diameter, a step part 42 with a small diameter and a stud 43, wherein the head part 41, the step part 42 and the stud 43 are coaxially connected in sequence.

Figure 10:
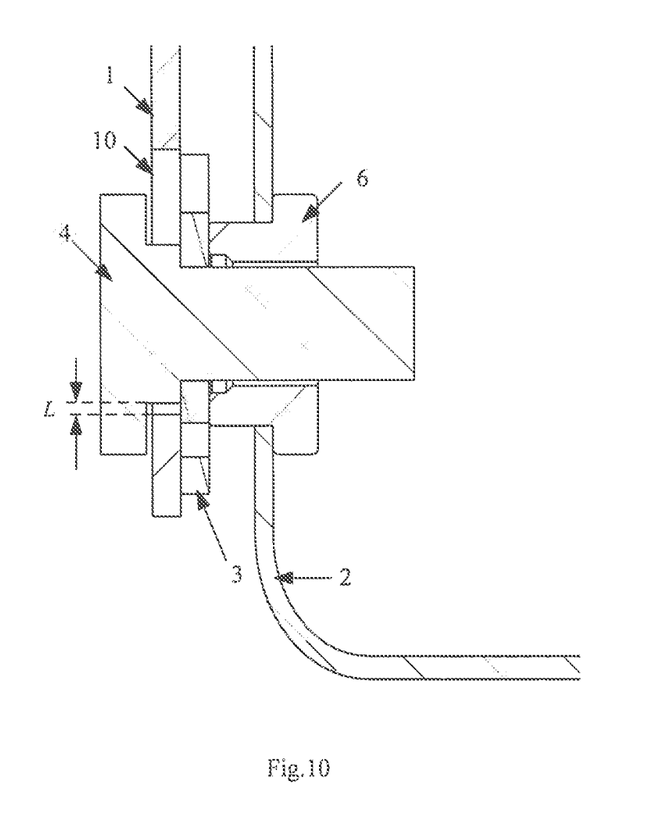
FIG. 10 is a cutaway diagram showing the assembled energy absorption structure according to the present invention.

The process for assembling the above energy absorption structure includes:

1) As shown in FIG. 2, welding the first nut 6, the second nut 7 on the corresponding positions on the cushion side plate 2;

2) As shown in FIG. 6A, positioning the energy absorption disc 3 on the angle adjuster lower connection plates 1, and making the annular part 31 of the energy absorption disc 3 coaxial with the circular groove part of the impact groove 10;

3) As shown in FIG. 10, passing the step bolt 4 through the cushion side plate 2 and the energy absorption disc 3 and threading it to the first nut 6 welded on the cushion side plate 2 so as to press the energy absorption disc 3 between the step part 42 of the step bolt 4 and the cushion side plate 2. Herein, gap L is formed between the bottom of the step part 42 and the bottom of the impact groove 10. Due to the gap, no friction force and extrusion force will be generated between the step bolt 4 and the angle adjuster lower connection plates 1 because the force generated during the fracture of the energy absorption disc 3 depends on the fracture force of the energy absorption disc 3; and 4) Passing the front bolt 5 through the angle adjuster lower connection plates 1 and connecting it to the cushion side plate 2, then the assembly process ends.

Figure 11:
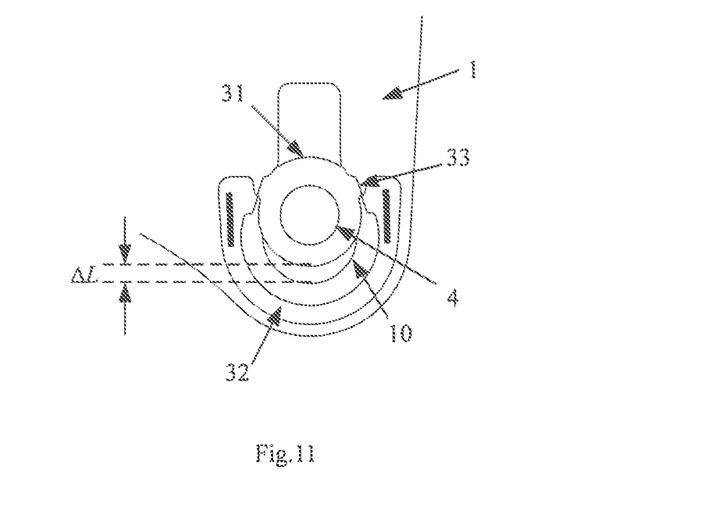
FIG. 11 is a diagram showing breakage of the energy absorption disc after collision according to the present invention.
Figure 12:
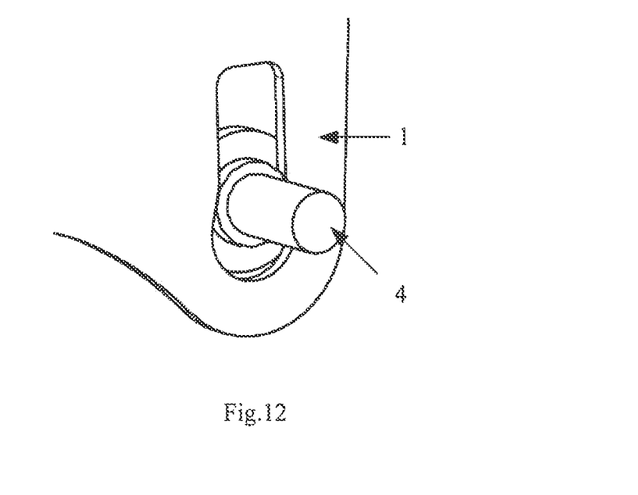
FIG. 12 is a diagram showing collision between the step bolt and the angle adjuster lower connection plate according to the present invention.
Figure 13:
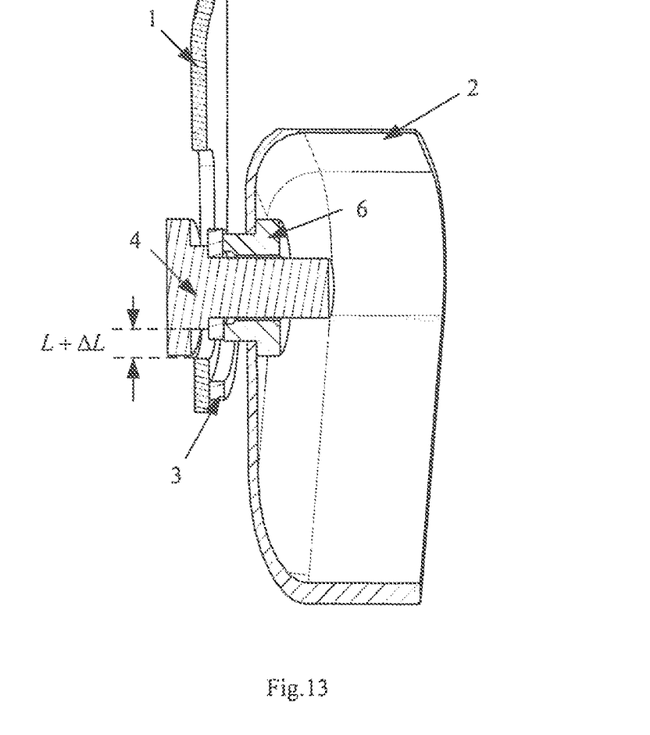
FIG. 13 is a cutaway diagram showing the energy absorption structure during collision of the present invention.
Figure 14:
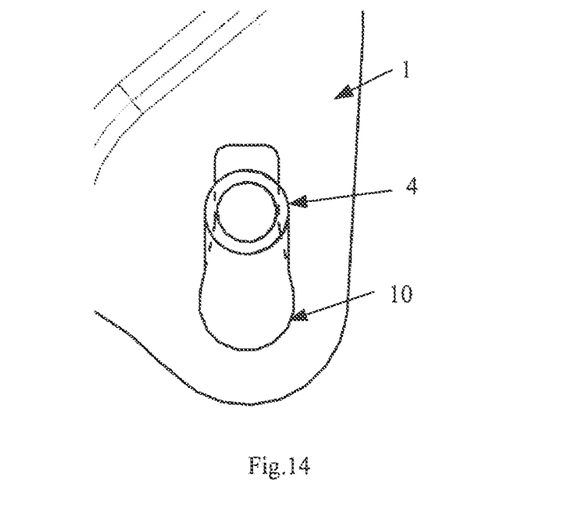
FIG. 14 is a diagram showing the energy absorption disc pressing the straight groove part during collision according to the present invention.
Figure 15:
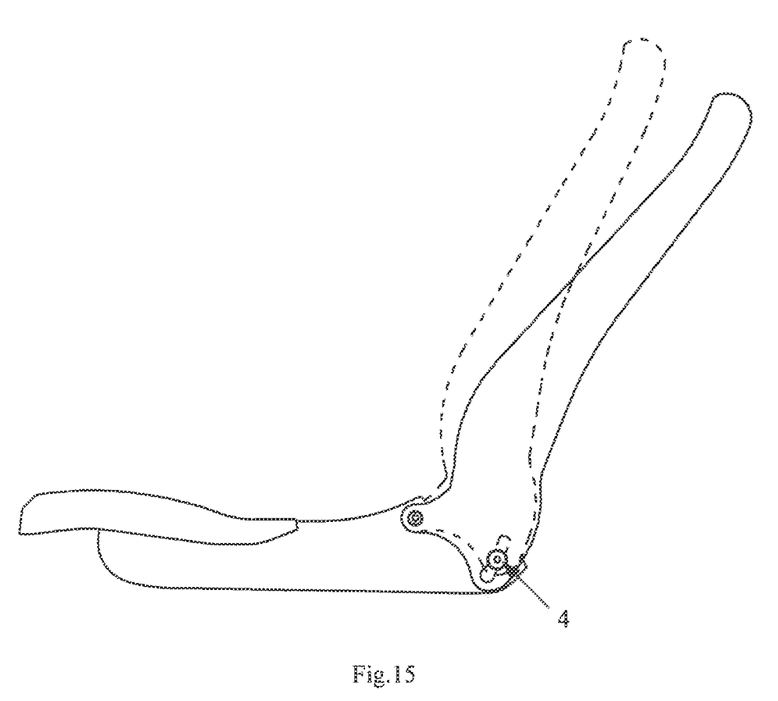
FIG. 15 is a diagram showing deformation of the vehicle seat during collision according to the present invention.

When the rear-end collision happens, the step bolt 4 rotates about the front bolt 5 due to the back chair assembly and shears the energy absorption disc 3 (as shown in FIG. 11, the step bolt 4 breaks the impact fracture parts 33 of the energy absorption disc), and moves upwardly with the broken annular pan 31 (as shown in FIG. 12). After the step bolt 4 moves distance ΔL, the step part 42 of the step bolt 4 abuts the bottom of the straight groove part of the impact groove 10 (as shown in FIG. 13) and then presses the angle adjuster lower connection plate 1 with constant force (as shown in FIG. 14, the straight groove part of the lower connection plate is broadened, and the dotted line represents the initial profile of the straight groove part), so as to make the back chair assembly rotating backward about the front bolt 5 to absorb energy (as shown in FIG. 15, the dotted line represents initial position of the back chair assembly).

Therefore, the energy absorption structure of the present invention has the advantages of simple structure and convenient installation, and can absorb impact energy during collision. In addition, the present application further has the following advantages:

1. The resulting force is stable and adjustable: based on the material strength, thickness and fracture cross sectional area, the force can be calculated as follows: force F1=allowable tension σ1* cross sectional area S, wherein the allowable tension σ1 of the material of the energy absorption disc 3 is constant, thus the force F1 can be adjusted by varying the cross sectional area S of the impact fracture parts 33. The extrusion force F2 on the impact groove 10 of the lower connection plate can be adjusted by changing the interference extrusion amount Ψ between the connection plate 1 and the step bolt 4: extrusion force F2=allowable tension σ2* extrusion amount Ψ * coefficient.

2. Good fatigue resistance: the energy absorption disc 3 not only ensures the force produced during the collision failure, but also ensures no fail due to fatigue will happen under normal condition, thus not influencing the function of the seat under the normal condition.

3. Eliminating the effect of the friction force generated by bolt fastening: when the back chair connects with the cushion via a bolt, it is not necessary to account the influence of the sliding friction force generated by the axial force of the fastening bolt during the movement of mechanism. Since the step bolt 4 passes through the circular groove on the lower connection plate and spaced from the bottom of the circular groove, and the step part 42 presses against the energy absorption disc 3, when the energy absorption disc 3 fractures and generates force, the axial force of the step bolt 4 does not influence the fracture of the energy absorption disc 3.

The above discussion merely represents preferred embodiments of the present invention and does not intend to limit the scope of the present invention. The above embodiments of the present invention can also make various variations. That is, the simple, equivalent changes and modifications made according to the contents of the claims and specifications of the present invention fall into the scope of protection of the present invention.

What is claimed is:

1. A vehicle seat with an energy absorption structure, including a cushion side plate and an angle adjuster lower connection plate, wherein an impact groove is provided on the angle adjuster lower connection plate, and the impact groove includes a straight groove part and a circular groove part communicating each other from top to bottom,
   wherein the vehicle seat further includes:
   an energy absorption disc, including an annular part, a position part and impact fracture parts connected between the annular part and the position part;
   a first nut securely coupling to the cushion side plate; and
   a step bolt including a head part, a step part and a stud which are coaxially connected in sequence, the stud passes through the circular groove part, the annular part and threads to the first nut to make the step part passing through the circular groove part and press-fitting with the energy absorption disc.

2. The vehicle seat with an energy absorption structure according to claim 1, wherein the cushion side plate and the angle adjuster lower connection plate are connected by a front bolt and a second nut.

3. The vehicle seat with an energy absorption structure according to claim 1, wherein the outer diameter of the step part is smaller than the inner diameter of the circular groove part so that the lowest point of the step part is spaced from the lowest point of the circular groove part when the step part press-fits with the energy absorption disc.

4. The vehicle seat with an energy absorption structure according to claim 1, wherein the angle adjuster lower connection plate is a planar structure.

5. The vehicle seat with an energy absorption structure according to claim 1, wherein the angle adjuster lower connection plate includes a cushion mounting surface and an energy absorption disc mounting surface at different planes, so that the energy absorption disc is flush with the cushion mounting surface after mounting on the energy absorption disc mounting surface.

6. The vehicle seat with an energy absorption structure according to claim 1, wherein the cross-sectional area of the impact fracture part is 6-9 mm².

7. The vehicle seat with an energy absorption structure according to claim 1, wherein, the first nut is welded on the cushion side plate.

* * * * *